July 1, 1969 — J. J. FERREIRA — 3,452,378

PROCESS OF MAKING A GOLF SHOE

Filed Oct. 5, 1967

INVENTOR.
Joseph J. Ferreira
BY
Kenway, Jenney & Hildreth

United States Patent Office 3,452,378
Patented July 1, 1969

3,452,378
PROCESS OF MAKING A GOLF SHOE
Joseph J. Ferreira, Raynham, Mass., assignor to Frank Noone Shoe Co., Inc., Rockland, Mass., a corporation of Massachusetts
Filed Oct. 5, 1967, Ser. No. 673,140
Int. Cl. A43d 65/02
U.S. Cl. 12—142                              2 Claims

ABSTRACT OF THE DISCLOSURE

Injection process of making golf shoes, characterized by the steps of enclosing a lasted shoe bottom in a mold having hollow socket studs positively located therein, and then injecting PVC or the like into the mold cavity, enclosing the sockets and forming a molded outsole. The socket studs may be located in the mold by means of mold pins or by being preassembled on a templet of sheet metal.

---

The invention comprises a novel injection process of making golf shoes and the new and improved product thereof.

An object of the invention is to provide a golf shoe having an outsole molded of synthetic resin and containing a pattern of socket studs for calks arranged in predetermined pattern and permanently and securely maintained in position in the shoe bottom by being embedded in the body of the molded outsole.

To this end an important feature of the invention consists in employing a sole shaped mold having a group of prearranged mold pins projecting into the forepart of its mold cavity in the pattern desired of the calks. In carrying out the process hollow socket studs are fitted upon these mold pins and seated against the bottom of a lasted shoe or in contact with a midsole if one is employed.

The socket studs are preferably preassembled in a sheet metal carrier plate or templet in registration with the projecting mold pins so that they may be accurately presented and fitted in one operation while the plate remains permanently as a reinforcing element in the shoe bottom.

The novel process of this invention is advantageous in that it ensures accurate location of the calks in the shoe bottom and permanent maintenance thereof in wear, all at relatively low manufacturing cost and with the employment of apparatus immediately available.

Figure 1:
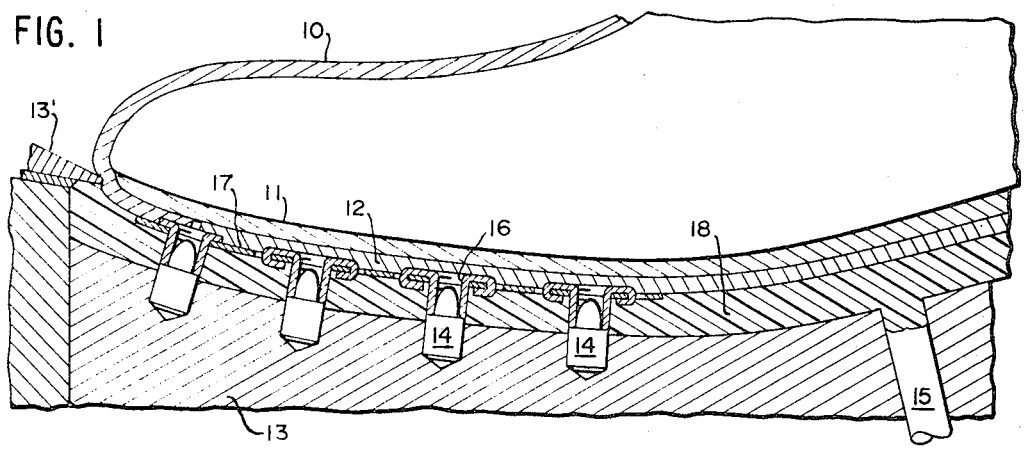
Figure 2:
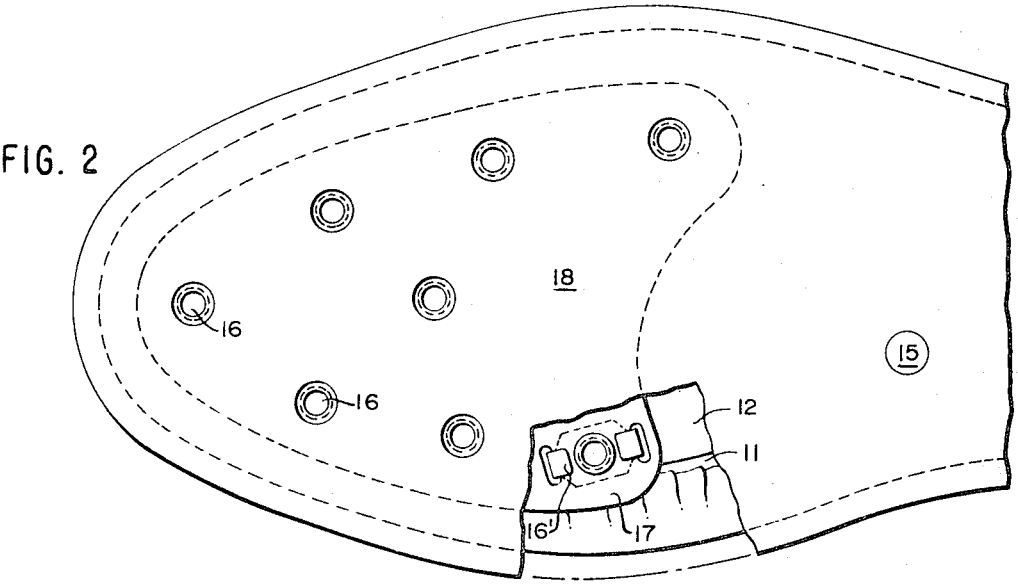
Figure 3:
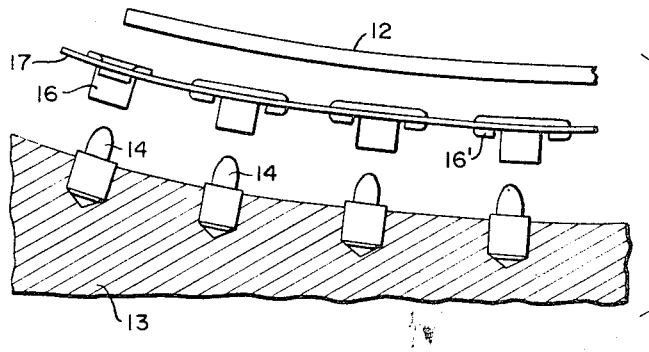

The features of the invention will be best understood and appreciated from the following description of a preferred manner of carrying out the process and of the product thereof, as shown in the accompanying drawings in which:

FIG. 1 is a view in longitudinal section showing the forepart of a lasted shoe in the mold, FIG. 2 is a bottom plan view of the shoe bottom showing the templet in place with the socket studs placed in registration with the mold pins, and FIG. 3 is a fragmentary exploded view of the shoe bottom component.

The forepart of a shoe is shown in FIG. 1 as having an upper 10 which may be conventionally cement-lasted to an insole 11 and also a midsole 12 as part of the shoe bottom. The overlasted margin of the upper is indicated in FIG. 2 where the outsole is broken away.

The mold may be of the character more fully described in my United States Letters Patent No. 3,246,068. It includes a bottom mold plate 13, side molds (not shown) and beveled welt-forming plates 13'. The mold plate 13 is provided with an inlet passage 15 for the injected outsole material.

The shoe bottom itself constitutes the upper surface of the mold, defining the mold cavity as the space between the mold plate 13 and the midsole 12. In the forepart of the mold plate are placed in a group of projecting mold pins 14 spaced and arranged in the desired pattern for the calks of the finished shoe. The purpose of these mold pins is positively to locate an equal number of hollow threaded socket studs 16 with a spacing and in the pattern desired of the calks and to prevent the resinous material which is to be injected into the mold cavity from entering the socket studs. It will be understood that it is important to keep the internal thread of the studs clear of injected resin so that in the finished shoe the stud will be in condition to receive the threaded shank of a calk such for example as that shown in United States Letters Patent 2,624,128, January 6, 1953.

The socket studs 16 may be individually placed upon the mold pins 14 or they may be preassembled in a carrier plate or templet 17 as best shown in FIG. 3. For that purpose each stud comprises a flanged threaded barrel which is arranged to lie upon the upper surface of the templet 17 as shown in FIG. 3 and radially extending ears 16' which are arranged to be clenched over on the lower surface of the templet 17 so that each socket stud is securely and permanently secured in registration with a corresponding mold pin 14.

Having assembled the socket studs they are presented to the mold pins 14 and pressed firmly into contact with the lower surface of the midsole 12, while the templet itself engages the midsole in all of the area between the studs. It will be seen that the templet 17 coincides in contour with the forepart of the shoe but is reduced in comparative size so that it overlaps the lasting margin of the upper but does not completely cover it.

Having assembled the lasted shoe in the mold as shown in FIG. 1 the hot fluid PVC or other resin is injected through the inlet passage 15 in the mold plate filling the mold cavity enclosing the socket studs 16 and forming a complete outsole 18. In this operation the PVC of the outsole forms a direct bond with the midsole and other components of the shoe bottom beyond the contour of the templet 17. The complete outsole 18 is formed with a mold-finished edge surface requiring no further treatment and having its marginal edge molded to present the appearance of a welt. At the conclusion of the molding operation the shoe bottom, with its embedded socket studs 16, is removed from the mold leaving the outer ends of the threaded studs in substantially flush relation to the outer surface of the outsole 18 in readiness to receive the threaded shanks of the calks.

A plastic compound well suited for the described process is polyvinyl chloride, herein referred to as PVC, and this may be plasticized to develop a more or less rubbery texture and to be compatible with the cement coating usually applied to the insole 11. My novel process is not, however, limited to the employment of PVC but may be carried out with other vinyl or synthetic resinous compounds having equivalent properties.

It is contemplated moreover that the midsole 12 may be supplemented by a cushion ply of foamed rubber or the like which will provide additional bonding area with the templet 17.

While I prefer to locate the socket studs 16 with the assistance of the mold pins 14, it will be apparent that the spacing and arrangement of the socket studs with respect to each other is positively fixed by assembling the studs with the sheet metal templet 17. They may be then transferred in this condition to the shoe bottom where the proper position of the templet is easily determined. Under these conditions the inner ends of the hollow socket studs are sealed from injected PVC by pressure against the midsole 12 and no mold pins are required except for locating the templet with its already arranged studs.

Having thus disclosed my invention what I claim as new and desire to secure by Letters Patent is:

1. A process of making golf shoes, comprising the steps of enclosing the bottom of a lasted shoe in a mold having a group of hollow socket studs positively located in the mold cavity upon prearranged mold pins projecting therein, and then injecting PVC into the cavity thus enclosing the said socket studs while at the same time preventing the PVC from entering the sockets, and forming an outsole bonded into the shoe bottom and enclosing the socket studs while so located.

2. A process of making golf shoes as defined in claim 1, further characterized by mounting the hollow socket studs in a thin templet having the contour of the shoe bottom but of reduced area, positively locating the templet in the mold by prearranged mold pins so as to expose a peripheral zone of the shoe bottom, and then injecting PVC into the mold cavity, enclosing the socket studs and forming an outsole bonded to the shoe bottom in the peripheral zone exposed by said sheet templet while the sockets are maintained in cleared condition by the mold pins.

References Cited

UNITED STATES PATENTS

| | | | |
|---|---|---|---|
| 2,002,869 | 5/1935 | Riddell | 36—67 |
| 3,156,987 | 11/1964 | Dassler | 36—2.5 |
| 3,237,323 | 3/1966 | MacNeill | 36—59 |
| 3,324,578 | 6/1967 | Brutting | 36—2.5 |
| 3,337,971 | 8/1967 | Rose | 36—2.5 |

PATRICK D. LAWSON, *Primary Examiner.*